UNITED STATES PATENT OFFICE.

ROBERT JOSEPH ELLIS AND GEORGE DOBSON, OF LIVERPOOL, ENGLAND, ASSIGNORS TO ELLIS, DOBSON AND MOORE, OF SAME PLACE.

IMPROVEMENT IN COMPOUNDS FOR PREVENTING INCRUSTATION IN STEAM-BOILERS.

Specification forming part of Letters Patent No. 132,820, dated November 5, 1872.

*To all whom it may concern:*

Be it known that we, ROBERT JOSEPH ELLIS and GEORGE DOBSON, both of Liverpool, England, have invented "an Improved Composition for Preventing Corrosion and Incrustation in Steam-Boilers"; and we do hereby declare the following to be a full, true, and exact description thereof.

Our invention for an improved composition for preventing corrosion and incrustation in steam-boilers consists in a fluid composed of silica-sand and carbonated soda-ash, in about equal proportions—if anything, a slight preponderance of the former—fused to vitrification in a suitable furnace, then dissolved by boiling water, and afterward concentrated in solution. Previous to concentration the fluid is mixed with carrageen or Irish moss, in solution, in the proportion of one part of concentrated solution of moss to four parts of the vitrified silica-sand and carbonated soda-ash, in solution. The composition or fluid thus obtained is injected or otherwise introduced into the interior of steam-boilers, or other steam-generating apparatus, and becomes mixed with the water contained therein, its effect being to prevent scale (forming on the plates of the boiler) of salt or other foreign matter that may be in the water; also this composition is deposited in a kind of film or skin on the plates of the boiler, and thus prevents corrosion of the plates by any injurious properties contained in the water. However strong the impregnation of the water, whether it be by sulphates or carbonates, it is only a question of quantity of composition to render them perfectly harmless in all cases to the boiler, and non-adherent as crustaceous deposit.

With some waters it will be sufficient to use the concentrated silica-sand and carbonated soda-ash, as first described, without the addition of the Irish moss, more particularly with water obtained by surface condensation; for it is evident by observation that water obtained by distillation, through the loss of some chemical ingredient, becomes highly corrosive, and acts most destructively upon boilers and tubes where such water is used. By the application of silica-sand and carbonated soda-ash, as before described, an exceedingly thin film or scale is at once deposited on the plates and around the surface of the tubes, which substantially protects the boiler and tubes from the action of this corrosive water.

The quantity of fluid composition used, and which will be effective in most cases, would be for a land-boiler of forty horse-power nominal, one quart per day, or six quarts per week; of course a proportionate quantity must be used for boilers of other sizes. For a marine boiler, on the first day, one pint for every one hundred horse-power nominal, and the same quantity daily during the continuance of a voyage.

Having thus described and ascertained the nature and object of our invention, what we claim as our invention, and desire to secure by Letters Patent, is—

1. As a new article of manufacture, a compound composed of silica-sand, carbonated soda-ash, and carrageen or Irish moss, the whole concentrated in solution, as described, to be used for preventing corrosion and incrustation in steam-boilers, substantially in the manner set forth.

2. As a new article of manufacture, the compound composed of silica-sand and carbonated soda-ash, concentrated in solution, as described, for preventing corrosion and incrustation in steam-boilers, substantially in the manner set forth.

In witness whereof we, the said ROBERT JOSEPH ELLIS and GEORGE DOBSON, have hereunto set our hands and affixed our seals this 3d day of October, 1872.

ROBERT JOSEPH ELLIS. [L. S.]
GEORGE DOBSON. [L. S.]

Witnesses:
FREDERICK JOHN CHEESBROUGH,
JOHN HAMILTON REDMOND,
*Both of 15 Water street,*
*Liverpool, England.*